(12) United States Patent
Walker et al.

(10) Patent No.: US 12,506,913 B2
(45) Date of Patent: Dec. 23, 2025

(54) UNIFIED MULTIMEDIA STREAMING

(71) Applicant: Capital One Services, LLC, McLean, VA (US)

(72) Inventors: Matthew Walker, Anna, TX (US); Mohamed Seck, Aubrey, TX (US); Randy Rasmussen, Allen, TX (US)

(73) Assignee: Capital One Services, LLC, McLean, VA (US)

( * ) Notice: Subject to any disclaimer, the term of this patent is extended or adjusted under 35 U.S.C. 154(b) by 56 days.

(21) Appl. No.: 18/400,518

(22) Filed: Dec. 29, 2023

(65) Prior Publication Data

US 2025/0220258 A1    Jul. 3, 2025

(51) Int. Cl.
*H04N 21/25* (2011.01)
*H04N 21/222* (2011.01)
*H04N 21/254* (2011.01)
*H04N 21/2543* (2011.01)

(52) U.S. Cl.
CPC ......... *H04N 21/251* (2013.01); *H04N 21/222* (2013.01); *H04N 21/2541* (2013.01); *H04N 21/2543* (2013.01)

(58) Field of Classification Search
None
See application file for complete search history.

(56) References Cited

U.S. PATENT DOCUMENTS

| | | | |
|---|---|---|---|
| 8,949,873 B1 * | 2/2015 | Bayer | H04N 21/25891 725/14 |
| 9,094,730 B1 * | 7/2015 | Kirmse | H04N 21/41407 |
| 9,225,763 B2 | 12/2015 | Baird et al. | |
| 9,473,815 B1 * | 10/2016 | Inzerillo | H04N 21/4508 |
| 9,866,646 B2 * | 1/2018 | Chandhok | H04L 67/55 |
| 9,875,480 B2 * | 1/2018 | Xiong | H04N 21/8543 |

(Continued)

FOREIGN PATENT DOCUMENTS

WO    WO-2023027728 A1 *  3/2023  ......... G06Q 30/0275

OTHER PUBLICATIONS

L. Arman et al., "Identifying Potential Problem Perceived by Consumers Within the Recommendation System of Streaming Services," Degree Project in Technology, KTH Royal Institute of Technology, Stockholm, Sweden (2022), 85 pages.

(Continued)

*Primary Examiner* — William J Kim
(74) *Attorney, Agent, or Firm* — Harrity & Harrity, LLP

(57) ABSTRACT

In some implementations, a user device may transmit a plurality of credentials, to a streaming host, associated with a user and corresponding to a plurality of streaming services. The user device may receive, from the streaming host, instructions for a user interface (UI) indicating a suggested program based on watch histories associated with the user and including an element associated with the suggested program. The user device may output the UI and may detect an interaction with the element. The user device may transmit, to the streaming host, an indication of the interaction. The user device may receive, from the streaming host and in response to the indication of the interaction, a stream of the suggested program. The user device refrains from executing an application associated with a selected streaming service, in the plurality of streaming services, that hosts the suggested program.

20 Claims, 10 Drawing Sheets

(56) References Cited

U.S. PATENT DOCUMENTS

| | | | |
|---|---|---|---|
| 10,045,070 B2 | 8/2018 | Markley et al. | |
| 10,110,939 B1* | 10/2018 | Wittke | H04N 21/26283 |
| 11,849,185 B2* | 12/2023 | Burbank | H04N 21/4627 |
| 11,962,864 B2* | 4/2024 | Klappert | H04N 21/4821 |
| 2003/0105827 A1* | 6/2003 | Tan | H04M 3/436 |
| | | | 709/206 |
| 2003/0135853 A1* | 7/2003 | Goldman | H04N 21/44224 |
| | | | 348/E7.071 |
| 2004/0210450 A1* | 10/2004 | Atencio | H04M 3/42153 |
| | | | 705/30 |
| 2004/0255333 A1* | 12/2004 | Kenworthy | H04N 21/812 |
| | | | 348/E7.071 |
| 2006/0059511 A1* | 3/2006 | Nocifera | H04H 60/06 |
| | | | 348/E7.054 |
| 2006/0080453 A1* | 4/2006 | Thukral | H04N 21/8355 |
| | | | 348/E7.056 |
| 2007/0121869 A1* | 5/2007 | Gorti | H04L 65/80 |
| | | | 379/201.02 |
| 2008/0270725 A1* | 10/2008 | Roden | H04N 21/2743 |
| | | | 711/E12.001 |
| 2009/0265742 A1* | 10/2009 | Schwartz | H04N 7/17318 |
| | | | 725/46 |
| 2009/0282432 A1* | 11/2009 | Hahnefeld | H04L 63/10 |
| | | | 705/26.1 |
| 2011/0321129 A1* | 12/2011 | Kinsel | G06F 16/9535 |
| | | | 707/E17.014 |
| 2013/0174186 A1* | 7/2013 | Kelsen | H04N 21/42684 |
| | | | 725/2 |
| 2013/0262633 A1* | 10/2013 | Goodwin | H04N 21/25891 |
| | | | 709/219 |
| 2013/0275611 A1* | 10/2013 | Somekh | H04N 21/251 |
| | | | 709/231 |
| 2013/0332838 A1* | 12/2013 | Naggar | G06Q 30/0605 |
| | | | 715/733 |
| 2014/0325537 A1* | 10/2014 | Garg | H04N 21/44204 |
| | | | 725/4 |
| 2014/0379801 A1* | 12/2014 | Gupta | H04N 21/4126 |
| | | | 709/204 |
| 2015/0365729 A1* | 12/2015 | Kaya | H04N 21/6582 |
| | | | 725/14 |
| 2017/0064390 A1* | 3/2017 | Kannan | H04N 21/482 |
| 2017/0238039 A1* | 8/2017 | Sabattini | H04N 21/8113 |
| | | | 705/14.73 |
| 2017/0251257 A1* | 8/2017 | OBrien | H04N 21/6175 |
| 2017/0280196 A1* | 9/2017 | Thomas | H04N 21/4826 |
| 2019/0356962 A1* | 11/2019 | Thomas | H04N 21/251 |
| 2021/0044576 A1* | 2/2021 | Carson | H04L 63/0815 |
| 2021/0099765 A1* | 4/2021 | Thomas | H04N 21/4532 |
| 2021/0105520 A1* | 4/2021 | Ramaraj | H04N 21/4828 |
| 2021/0289262 A1* | 9/2021 | O'Connor | H04N 21/251 |
| 2021/0297496 A1* | 9/2021 | Harb | H04L 67/306 |
| 2022/0345786 A1* | 10/2022 | Thomas | H04N 21/25891 |
| 2022/0377413 A1* | 11/2022 | Lidaka | A61B 5/6898 |
| 2022/0408259 A1* | 12/2022 | Adel | H04W 12/0431 |
| 2023/0362450 A1* | 11/2023 | Thomas | H04N 21/2665 |
| 2024/0056651 A1* | 2/2024 | Brunner | H04N 21/63345 |
| 2024/0236424 A1* | 7/2024 | Sanderson | H04N 21/4667 |

OTHER PUBLICATIONS

C. Pollette et al., "How Chromecast Works," retrieved from https://electronics.howstuffworks.com/gadgets/other-gadgets/roku-streaming-stick.htm (2021), 39 pages.

Xfinity Support, "What's Xfinity Flex?," retrieved from https://www.xfinity.com/support/articles/xfinity-flex-overview (accessed 2023), 3 pages.

* cited by examiner

UNIFIED MULTIMEDIA STREAMING

BACKGROUND

Streaming services generally provide users with credentials that allow the users to stream multimedia content to devices using the credentials. A user device may execute a separate application for each streaming service in order to stream multimedia content provided by that streaming service.

SUMMARY

Some implementations described herein relate to a system for unifying multimedia streaming services. The system may include one or more memories and one or more processors communicatively coupled to the one or more memories. The one or more processors may be configured to receive a plurality of credentials, for a user, corresponding to a plurality of streaming services. The one or more processors may be configured to transmit, to each streaming service in the plurality of streaming services, a request for a corresponding watch history associated with the user, wherein each request includes a corresponding credential in the plurality of credentials. The one or more processors may be configured to receive, from each streaming service, the corresponding watch history in response to the request. The one or more processors may be configured to provide each corresponding watch history to a machine learning model to receive an indication of a suggested program. The one or more processors may be configured to output, to a user device, instructions for a user interface indicating the suggested program and including an element associated with the suggested program. The one or more processors may be configured to receive, from the user device, an indication of an interaction with the element. The one or more processors may be configured to communicate, in response to the indication of the interaction, with an application programming interface (API) of a selected streaming service, in the plurality of streaming services, that hosts the suggested program. The one or more processors may be configured to stream the suggested program, to the user device and from the API of the selected streaming service, independently of execution of an application associated with the selected streaming service by the user device.

Some implementations described herein relate to a method of unifying multimedia streaming services. The method may include transmitting a plurality of credentials, from a user device and to a streaming host, associated with a user and corresponding to a plurality of streaming services. The method may include receiving, at the user device and from the streaming host, instructions for a user interface (UI) indicating a suggested program based on watch histories associated with the user and including an element associated with the suggested program. The method may include outputting the UI. The method may include detecting an interaction with the element. The method may include transmitting, from the user device and to the streaming host, an indication of the interaction. The method may include receiving, from the streaming host and in response to the indication of the interaction, a stream of the suggested program, wherein the user device refrains from executing an application associated with a selected streaming service, in the plurality of streaming services, that hosts the suggested program.

Some implementations described herein relate to a non-transitory computer-readable medium that stores a set of instructions for unifying multimedia streaming services. The set of instructions, when executed by one or more processors of a device, may cause the device to receive a plurality of credentials, for a user, corresponding to a plurality of streaming services. The set of instructions, when executed by one or more processors of the device, may cause the device to transmit, to an API for each streaming service in the plurality of streaming services, a request for a corresponding streaming history associated with the user, wherein each request includes a corresponding credential in the plurality of credentials. The set of instructions, when executed by one or more processors of the device, may cause the device to receive, from each API, the corresponding streaming history in response to the request. The set of instructions, when executed by one or more processors of the device, may cause the device to provide each corresponding streaming history to a machine learning model to receive an indication of a suggested program. The set of instructions, when executed by one or more processors of the device, may cause the device to output, to a user device, instructions for a UI indicating the suggested program.

DETAILED DESCRIPTION

The following detailed description of example implementations refers to the accompanying drawings. The same reference numbers in different drawings may identify the same or similar elements.

Streaming services may grant credentials to a user that allow the user to stream multimedia content using the credentials. The user may stream the multimedia content to a user device, and the user device may execute a separate application for each streaming service in order to stream multimedia content provided by that streaming service. As a result, power and processing resources are consumed each time the user device terminates one application and launches a different application in order to stream different multimedia content.

Additionally, each streaming service may recommend multimedia content to the user. However, inaccurate recommendations often result in the user scrolling through numerous pages of content to try to find something to watch (or otherwise consume). As a result, power and processing resources are consumed by the user device during scrolling.

Some implementations described herein enable a streaming host to combine application programming interfaces (APIs) from a plurality of streaming services. Therefore, a user device may access multimedia content from the plurality of streaming services without executing multiple applications on the user device. As a result, the user device conserves power and processing resources. Additionally, some implementations described herein enable the streaming host to combine streaming histories across the plurality of streaming services in order to recommend multimedia content for a user. Combining streaming histories across the plurality of streaming services results in more accurate recommendations and thus results in less scrolling from the user. As a result, the user device conserves power and processing resources that would otherwise have been wasted during scrolling.

FIGS. 1A-1E are diagrams of an example 100 associated with unified multimedia streaming. As shown in FIGS. 1A-1E, example 100 includes a user device, a streaming host, a plurality of streaming services, and a machine learning (ML) model (e.g., provided by an ML host). These devices are described in more detail in connection with FIGS. 3 and 4.

Figure 1A:
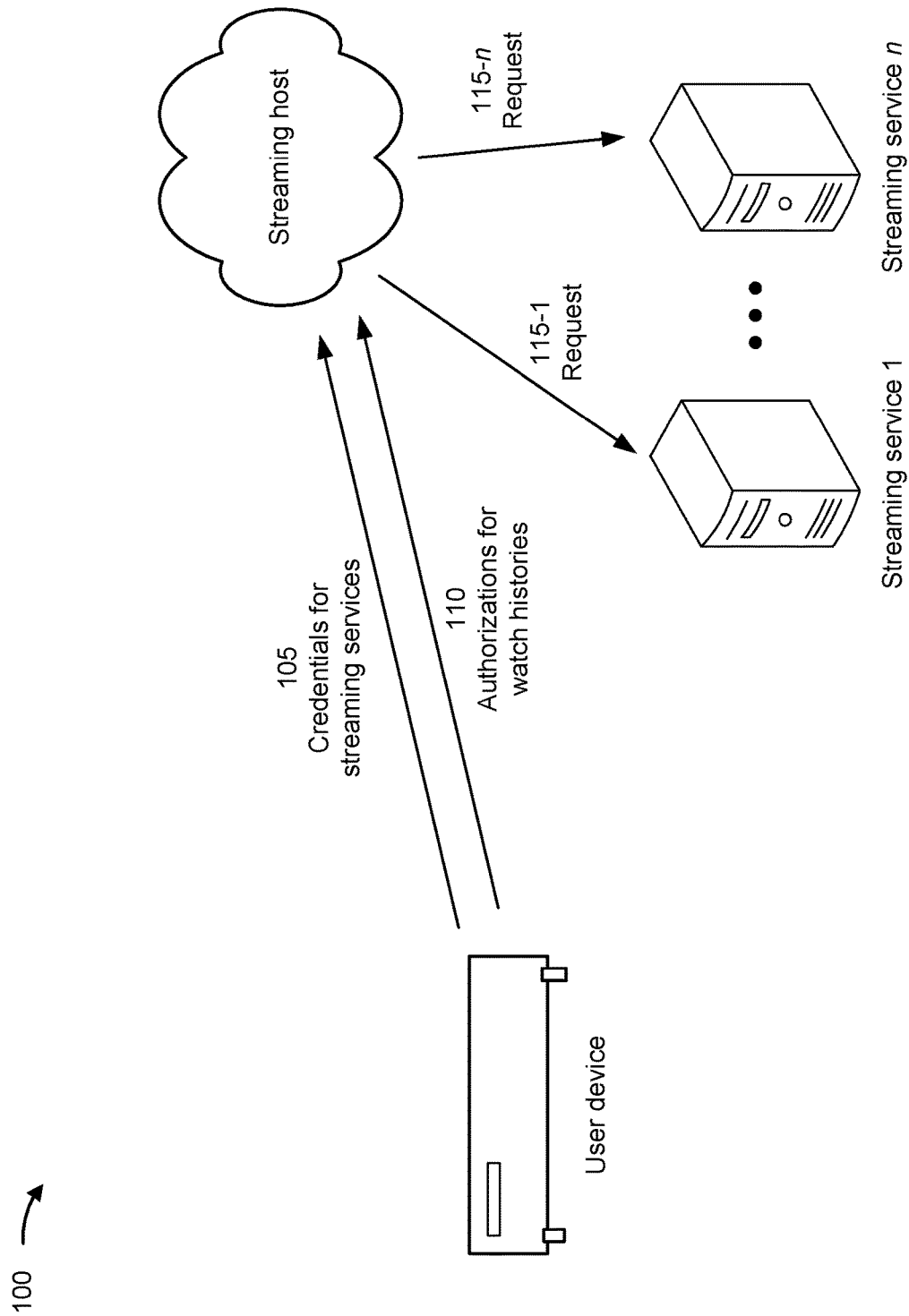
FIGS. 1A-1E are diagrams of an example implementation relating to unified multimedia streaming, in accordance with some embodiments of the present disclosure.

As shown in FIG. 1A and by reference number 105, the user device may transmit, and the streaming host may receive, a plurality of credentials corresponding to a plurality of streaming services. The plurality of credentials may additionally be associated with a user of the user device. For example, the plurality of streaming services may have configured the plurality of credentials for the user in order to grant the user access to multimedia content hosted by (or at least provided by) the plurality of streaming services.

In some implementations, the user device may transmit the plurality of credentials in response to a request from the streaming host. For example, the request may include a hypertext transmit protocol (HTTP) request, and the plurality of credentials may be transmitted in an HTTP response (e.g., encrypted using transport layer security (TLS) or secure sockets layer (SSL) consistent with HTTP secure (HTTPS)). In another example, the user device may call an API function associated with the streaming host and include the plurality of credentials as arguments in the API call. In some implementations, the user of the user device may provide input (e.g., via an input component of the user device) that triggers the user device to transmit the plurality of credentials. For example, the request from the streaming host may result in a UI (e.g., output via an output component of the user device), and the user may interact with the UI to trigger the user device to transmit the plurality of credentials. Additionally, or alternatively, a web browser (or another application executed by the user device) may transmit an HTTP request for a website hosted by (or at least associated with) the streaming host (or otherwise contact an endpoint associated with the streaming host). Accordingly, the user may interact with a UI output by the web browser to trigger the user device to transmit the plurality of credentials.

In some implementations, the plurality of credentials may include a username-password pair (e.g., at least one username-password pair). For example, the user may have selected the username-password pair when registering with one of the plurality of streaming services. Additionally, or alternatively, the plurality of credentials may include a token (e.g., at least one token). For example, one of the plurality of streaming services may have transmitted the token to the user device in order to allow the user device to access that streaming service.

In some implementations, the user device may transmit the plurality of credentials in a plurality of messages. Accordingly, each message may further include an authorization to access a watch history associated with the user. Alternatively, as shown by reference number 110, the user device may transmit a plurality of authorizations to access watch histories, associated with the plurality of streaming services, separately from the plurality of credentials. In one example, the user may interact with a UI to trigger the user device to transmit the plurality of authorizations. The UI may include checkboxes, radio buttons, or other interactive elements that trigger the user device to transmit the plurality of authorizations.

In the example 100, the streaming host is associated with an endpoint that is different from a plurality of endpoints corresponding to the plurality of streaming services. For example, a web browser (or another application executed by the user device) may transmit a request to the endpoint associated with the streaming host rather than transmitting requests to the plurality of endpoints corresponding to the plurality of streaming services. As a result, the user device may reduce network overhead that is consumed in accessing content from the plurality of streaming services.

As shown by reference numbers 115-1 through 115-n, the streaming host may transmit, and each streaming service in the plurality of streaming services (labeled from "1" to "n" in FIG. 1A) may receive, a request for a corresponding watch history associated with the user. Each request may include an HTTP request, a file transfer protocol (FTP) request, and/or an API call. In some implementations, each request may include a corresponding credential, in the plurality of credentials, for the streaming service. In other words, the streaming host may use different credentials to access different watch histories, associated with the user, from different streaming services.

Figure 1B:
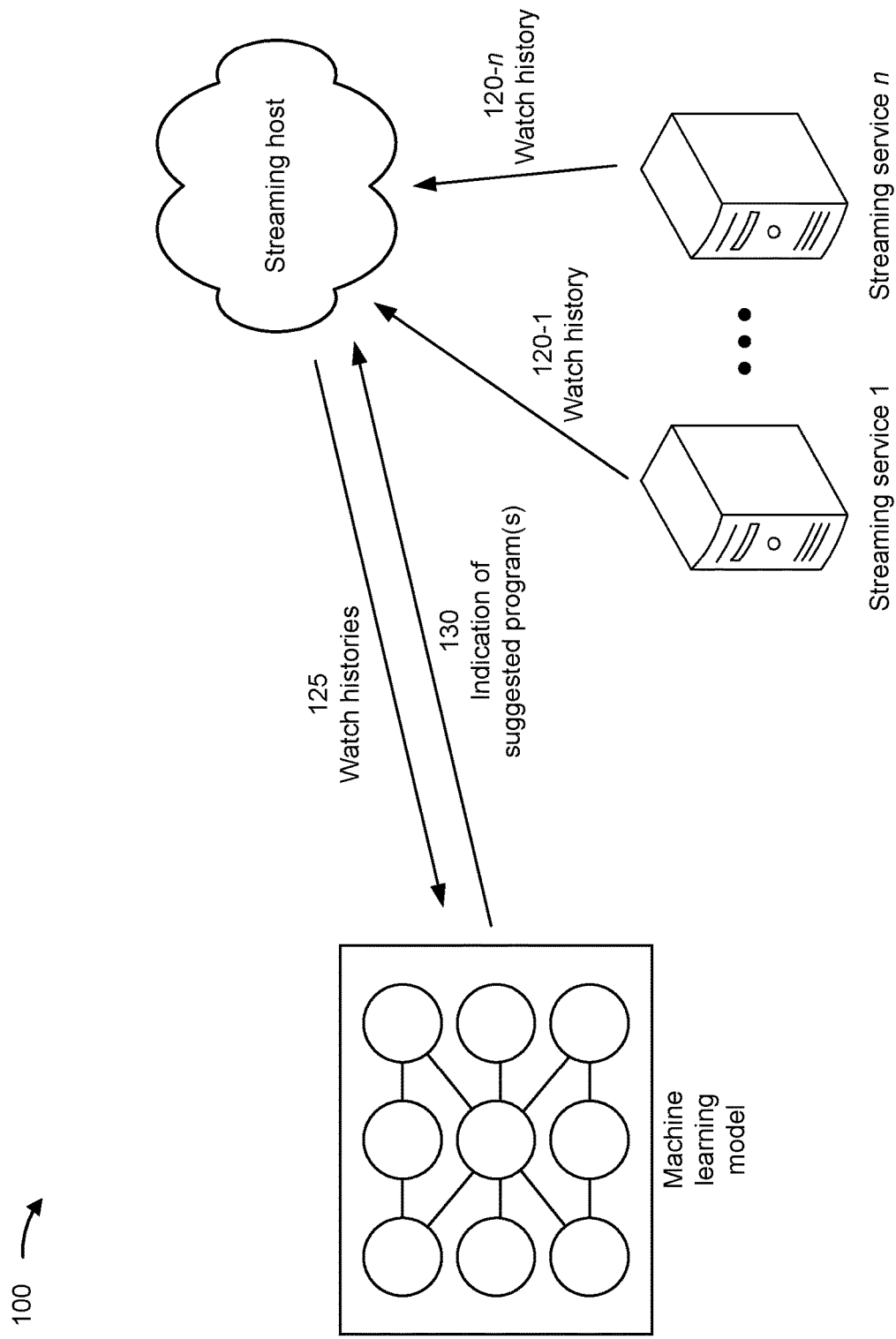

As shown in FIG. 1B and by reference numbers 120-1 through 120-n, each streaming service may transmit, and the streaming host may receive, the corresponding watch history associated with the user. Each streaming service may transmit the corresponding watch history in response to the request from the streaming host. The corresponding watch history may be encoded in a single file or in multiple files. Accordingly, the corresponding watch history may be included in an HTTP response, an FTP response, and/or a return from an API function. The streaming host may obtain a more complete watch history for the user by combining watch histories across the plurality of streaming services.

In some implementations, a watch history, associated with one of the plurality of streaming services, may be related to a profile out of a plurality of profiles associated with the user. Accordingly, the user device may transmit, and the streaming host may receive, a selection (or another type of indication) of a profile associated with the user. For example, the profile may be indicated in a same message as includes a credential and/or an authorization for the streaming service, as described above. Alternatively, the profile may be indicated in a separate message. The streaming host may include an indication of the profile in the request transmitted to the streaming service, such that the corresponding watch history from the streaming service is associated with the profile.

Additionally, or alternatively, a watch history, associated with one of the plurality of streaming services, may be related to a plurality of profiles associated with the user. In other words, the streaming host may receive the corresponding watch history from the streaming service that combines different watch histories associated with different profiles in the plurality of profiles.

Although the example 100 is described in connection with watch histories, other examples may use streaming histories from non-video streaming services in addition to, or in lieu of, the watch histories. For example, at least one of the plurality of streaming services may be an audio-only streaming service (e.g., a podcast service, a music streaming service, and/or an audiobook service, among other examples).

As shown by reference number 125, the streaming host may provide each corresponding watch history to the ML model. For example, the streaming host may transmit, and the ML host may receive, a request including each corresponding watch history. The ML model may be trained (e.g., by the ML host and/or a device at least partially separate from the ML host) using a labeled set of watched content (e.g., for supervised learning). Additionally, or alternatively, the ML model may be trained using an unlabeled set of watched content (e.g., for deep learning). In one example, the ML model may be configured to compare preferences associated with the user (e.g., based on each corresponding watch history) to (anonymized) watch histories associated with other users. Accordingly, the ML model may determine a suggested program that the user is likely to enjoy based on the preferences associated with the user. As used herein, "likely to enjoy" refers to the suggested program being associated with a probability (e.g., calculated by the ML model) that satisfies a likeliness threshold.

In some implementations, the ML model may include a regression algorithm (e.g., linear regression or logistic regression), which may include a regularized regression algorithm (e.g., Lasso regression, Ridge regression, or Elastic-Net regression). Additionally, or alternatively, the ML model may include a decision tree algorithm, which may include a tree ensemble algorithm (e.g., generated using bagging and/or boosting), a random forest algorithm, or a boosted trees algorithm. A model parameter may include an attribute of a model that is learned from data input into the model (e.g., anonymized watch histories and/or feedback, as described in connection with FIG. 1D). For example, for a regression algorithm, a model parameter may include a regression coefficient (e.g., a weight). For a decision tree algorithm, a model parameter may include a decision tree split location, as an example.

Additionally, the ML host (and/or a device at least partially separate from the ML host) may use one or more hyperparameter sets to tune the ML model. A hyperparameter may include a structural parameter that controls execution of a machine learning algorithm by the cloud management device, such as a constraint applied to the machine learning algorithm. Unlike a model parameter, a hyperparameter is not learned from data input into the model. An example hyperparameter for a regularized regression algorithm includes a strength (e.g., a weight) of a penalty applied to a regression coefficient to mitigate overfitting of the model. The penalty may be applied based on a size of a coefficient value (e.g., for Lasso regression, such as to penalize large coefficient values), may be applied based on a squared size of a coefficient value (e.g., for Ridge regression, such as to penalize large squared coefficient values), may be applied based on a ratio of the size and the squared size (e.g., for Elastic-Net regression), and/or may be applied by setting one or more feature values to zero (e.g., for automatic feature selection). Example hyperparameters for a decision tree algorithm include a tree ensemble technique to be applied (e.g., bagging, boosting, a random forest algorithm, and/or a boosted trees algorithm), a number of features to evaluate, a number of observations to use, a maximum depth of each decision tree (e.g., a number of branches permitted for the decision tree), or a number of decision trees to include in a random forest algorithm.

Other examples may use different types of models, such as a Bayesian estimation algorithm, a k-nearest neighbor algorithm, an a priori algorithm, a k-means algorithm, a support vector machine algorithm, a neural network algorithm (e.g., a convolutional neural network algorithm), and/or a deep learning algorithm.

As shown by reference number 130, the health system may receive an indication of a suggested program (e.g., one or more suggested programs, as shown in FIG. 1B) from the ML model. The suggested program may be selected (e.g., by the ML model) from a set of available programs (e.g., based on the plurality of streaming services). In other words, the ML model may generate the suggested program based on what is available to the user (that is, what is available on the plurality of streaming services to which the user subscribes). Alternatively, the suggested program may be selected (e.g., by the ML model) from a set of possible programs (e.g., based on at least one streaming service not included in the plurality of streaming services). In other words, the ML model may generate the suggested program in order to recommend that the user subscribe to a new streaming service (and/or upgrade a tier level associated with a streaming service, in the plurality of streaming services, when the suggested program is associated with a higher tier level that the user is currently below).

By using watch histories across the plurality of streaming services, the ML model generates more accurate recommendations and thus results in less scrolling from the user. As a result, the user device conserves power and processing resources that would otherwise have been wasted during scrolling. In some implementations, the streaming model may provide an indication of a profile associated with the user (e.g., as described above) to the ML model. For example, the ML model may use only a portion of the corresponding watch history associated with the profile in order to further increase accuracy of the suggested program.

Figure 1C:
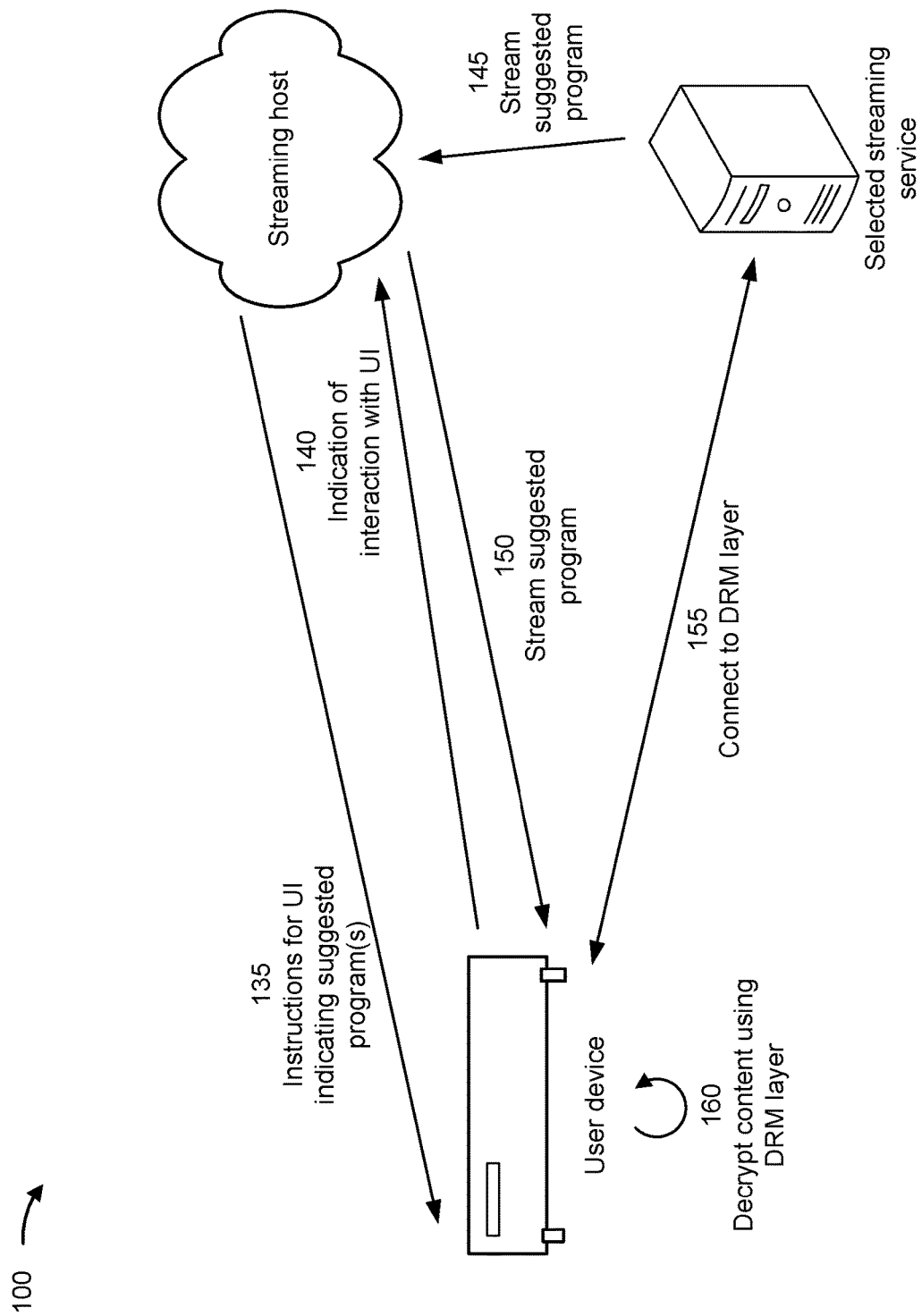

The streaming host may output instructions for a user interface (UI) indicating the suggested program. For example, as shown in FIG. 1C and by reference number 135, the streaming host may transmit, and the user device may receive, the instructions for the UI. In some implementations, the streaming host may provide a unified API to the user device, and the user device may receive the instructions for the UI using the unified API. Accordingly, the streaming host provides output to the user device (e.g., the instructions for the UI and/or streams of content, as described below) using the unified API. The UI may be as described in connection with FIG. 2. For example, the UI may further include an element (e.g., a button) associated with the suggested program.

The user device may output the UI to the user (e.g., using an output component of the user device). The user device may further detect an interaction with the element (associated with the suggested program) in the UI. For example, the user device may receive a signal from an input component of the user device and may determine that the signal is associated with the element (e.g., based on a location associated with the signal, such as a location on a display of the user device associated with a tap or a click, or based on an indication associated with an audio command, such as the words "suggested program" in the command).

As shown by reference number 140, the user device may transmit, and the streaming host may receive, an indication of the interaction. The indication of the interaction may include a request for the suggested program. For example, the request may include an HTTP request and/or an API call, among other examples. The request may include (e.g., in a header and/or as an argument) an indication of the suggested program (e.g., a name of the suggested program and/or an alphanumeric identifier associated with the suggested program, among other examples).

Accordingly, the streaming host may communicate with an API of a selected streaming service, in the plurality of streaming services, that hosts the suggested program. The streaming host may communicate with the selected streaming service in response to the indication of the interaction and in order to stream the suggested program, as shown by reference number 145. The streaming host may further stream the suggested program (e.g., by forwarding packets received from the selected streaming service) to the user device, as shown by reference number 150. The streaming host may stream the suggested program independently of execution of an application associated with the selected streaming service by the user device. In other words, the user device may execute an application associated with the streaming host in order to receive a stream of the suggested program; the user device may also refrain from executing the application associated with the selected streaming service. As a result, the user device may access multimedia content from the plurality of streaming services without executing multiple applications on the user device, and the user device thus conserves power and processing resources.

In some implementations, the suggested program may be protected by digital rights management (DRM). Accordingly, the streaming host may establish a connection with the user device and a DRM layer of the selected streaming service. For example, as shown by reference number 155, the user device may communicate (directly) with the DRM layer of the selected streaming service. The user device may still use the application associated with the streaming host, rather than the application associated with the selected streaming service, and the application associated with the streaming host may communicate with the DRM layer. Accordingly, the suggested program may be streamed in an encrypted format and thus may remain encrypted even when passing through the streaming host. Moreover, as shown by reference number 160, the user device may decrypt the suggested program based on authorization from the DRM layer. For example, the DRM layer may provide keys (or another type of authorization) that enable the user device to decrypt the suggested program (and output the program to the user).

Figure 1D:
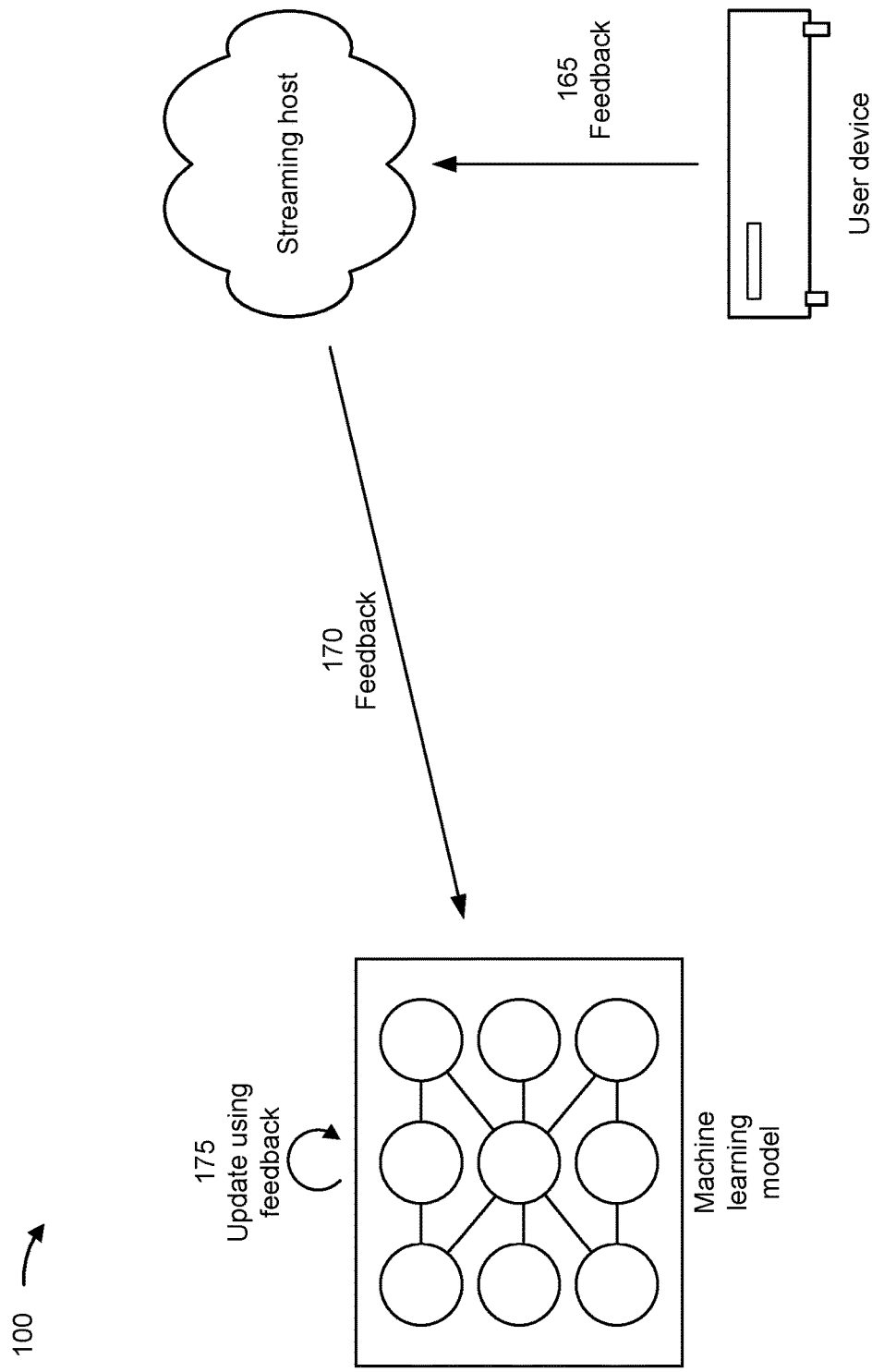

As shown in FIG. 1D, the streaming host may further improve accuracy of the ML model using feedback. As shown by reference number 165, the user device may transmit, and the streaming host may receive, feedback associated with the suggested program. For example, the feedback may include a rating (whether qualitative or quantitative) and/or text describing the user's sentiment regarding the suggested program. Accordingly, as shown by reference number 170, the streaming host may transmit, and the ML host may receive, the feedback. As shown by reference number 175, the ML host may update the ML model using the feedback. For example, the feedback may be added to a training data set, and the ML model may be re-trained on the updated training data set. Additionally, or alternatively, the ML model may be refined; for example, the feedback may be used to modify a portion of the ML model (e.g., adjusting activation weights in a neural network, among other examples). In implementations where the ML model is hosted and/or trained locally at the streaming host, the ML model is updated by the streaming host.

Figure 1E:
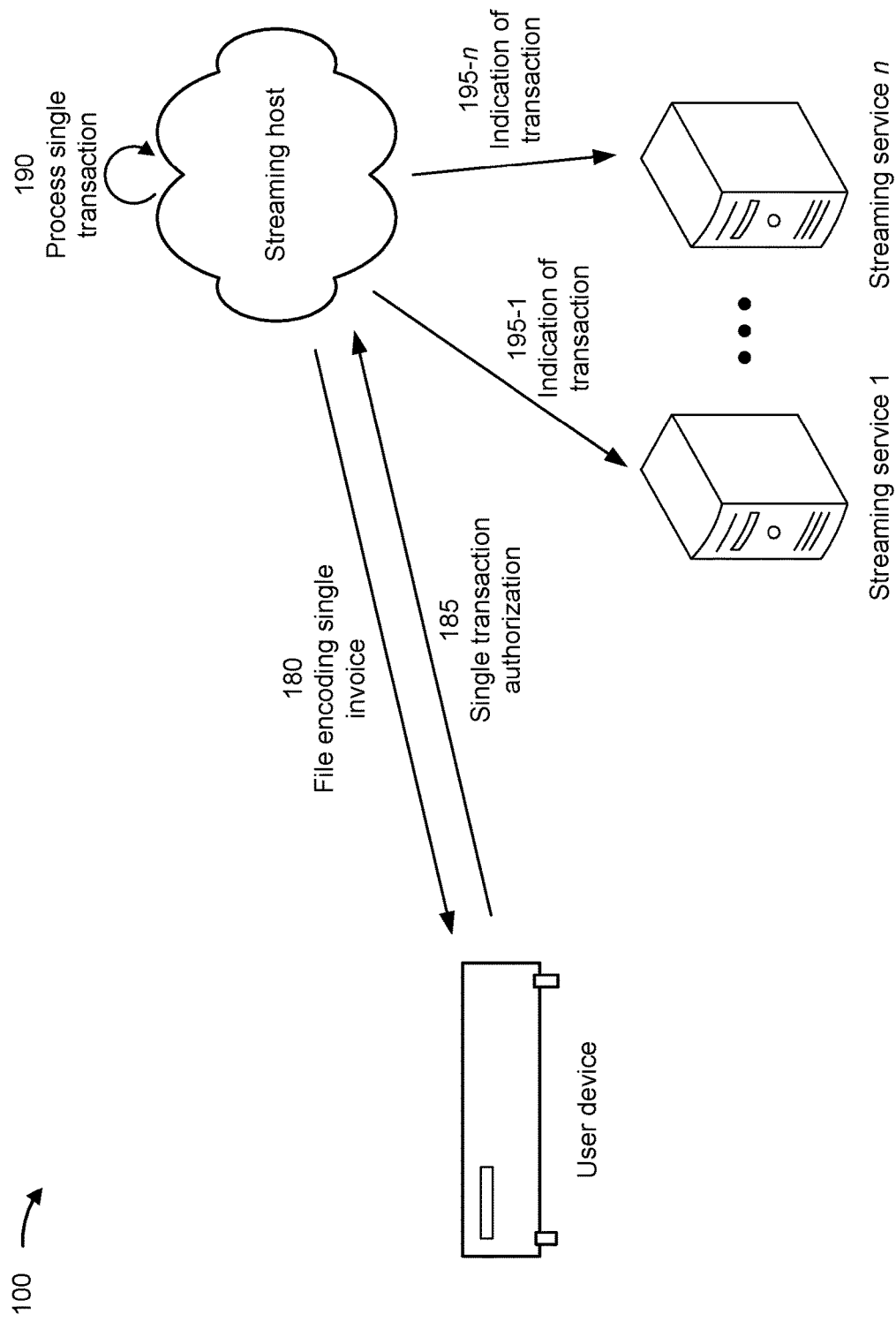

As shown in FIG. 1E, the streaming host may additionally unify billing for the plurality of streaming services. As shown by reference number 180, the streaming host may transmit, and the user device may receive, a single file encoding a single invoice for the plurality of streaming services. The file may include a portable document format (pdf) file, an image file, and/or another type of file that encodes line items and a total amount due. As shown by reference number 185, the user device may transmit, and the streaming host may receive, a single transaction authorization (e.g., a credit card authorization, a debit card authorization, and/or an automated clearing house (ACH) authorization, among other examples) for the plurality of streaming services. Therefore, as shown by reference number 190, the streaming host may process a single transaction using the transaction authorization. As a result, the streaming host may reduce network overhead that is consumed in processing payment for the plurality of streaming services. In some implementations, as shown by reference numbers 195-1 through **195-*n***, the streaming host may transmit, and each streaming service in the plurality of streaming services may receive, an indication of the single transaction (or at least a portion of the single transaction allocable to the streaming service). The indication may include a short message confirming payment and/or a file encoding details about the single transaction.

Although the example 100 is shown with a single set of requests for the corresponding watch histories, other examples may include the streaming host transmitting an additional request, to each streaming service, for a corresponding updated watch history associated with the user (e.g., periodically according to a schedule and/or aperiodically based on a trigger, such as the user device accessing the streaming host). Accordingly, the streaming host may provide each corresponding updated watch history to the ML model to receive an indication of an additional suggested program (e.g., periodically and/or aperiodically, as described above). Therefore, the streaming host may update the UI with the additional suggested program (either in real-time after the ML model generates a new suggestion and/or whenever the user device terminates a connection with the streaming host and then re-accesses the streaming host).

By using techniques as described in connection with FIGS. 1A-1E, the streaming host may combine APIs from the plurality of streaming services. Therefore, the user device may access multimedia content from the plurality of streaming services without executing multiple applications. As a result, the user device conserves power and processing resources. Additionally, the streaming host may combine the corresponding watch histories across the plurality of streaming services in order to recommend one or more suggested programs for the user. Combining watch histories across the plurality of streaming services results in more accurate suggested programs and thus results in less scrolling from the user. As a result, the user device conserves power and processing resources that would otherwise have been wasted during scrolling.

As indicated above, FIGS. 1A-1E are provided as an example. Other examples may differ from what is described with regard to FIGS. 1A-1E.

Figure 2:
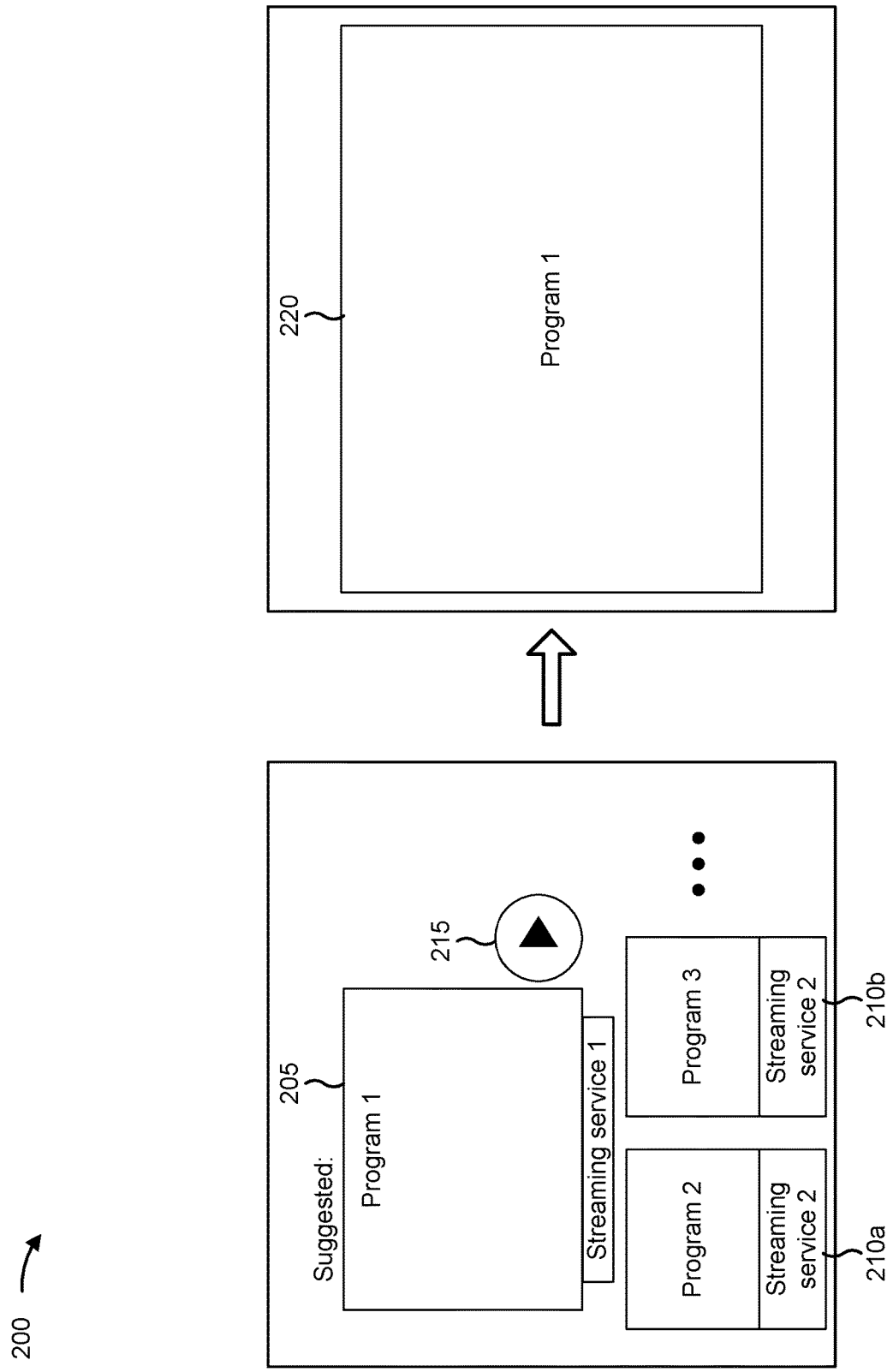
FIG. 2 is a diagram of an example user interface associated with a unified streaming portal, in accordance with some embodiments of the present disclosure.

FIG. 2 is a diagram of an example UI 200 associated with a unified streaming portal. The example UI 200 may be shown by a user device (e.g., based on instructions from a streaming host). These devices are described in more detail in connection with FIGS. 3 and 4.

As shown in FIG. 2, the example UI 200 may include an indication 205 of a suggested program. For example, the indication 205 may include a title of the suggested program along with one or more still images and/or video clips from the suggested program. In some implementations, the indication 205 may further include a name of a streaming service that hosts the suggested program. The example UI 200 may further include one or more indications associated with a watch history of a user (e.g., indication 210a and indication 210b in FIG. 2). Accordingly, the user may understand why the suggested program is being recommended.

As further shown in FIG. 2, the example UI 200 may include an element 215 that the user may use to trigger streaming of the suggested program. In FIG. 2, the element 215 is a button, but other interactive elements may be used instead. Based on interaction with the element 215, the example UI 200 may be modified to include a stream 220 of the suggested program (in place of the indications 205, 210a, and 210b).

As indicated above, FIG. 2 is provided as an example. Other examples may differ from what is described with regard to FIG. 2. For example, the stream 220 may be a stream of an audio-only program (e.g., a podcast, an audiobook, and/or an album, among other examples); therefore, a visual portion of the stream 220 may include album art, a title, lyrics, and/or a music video, among other examples.

Figure 3:
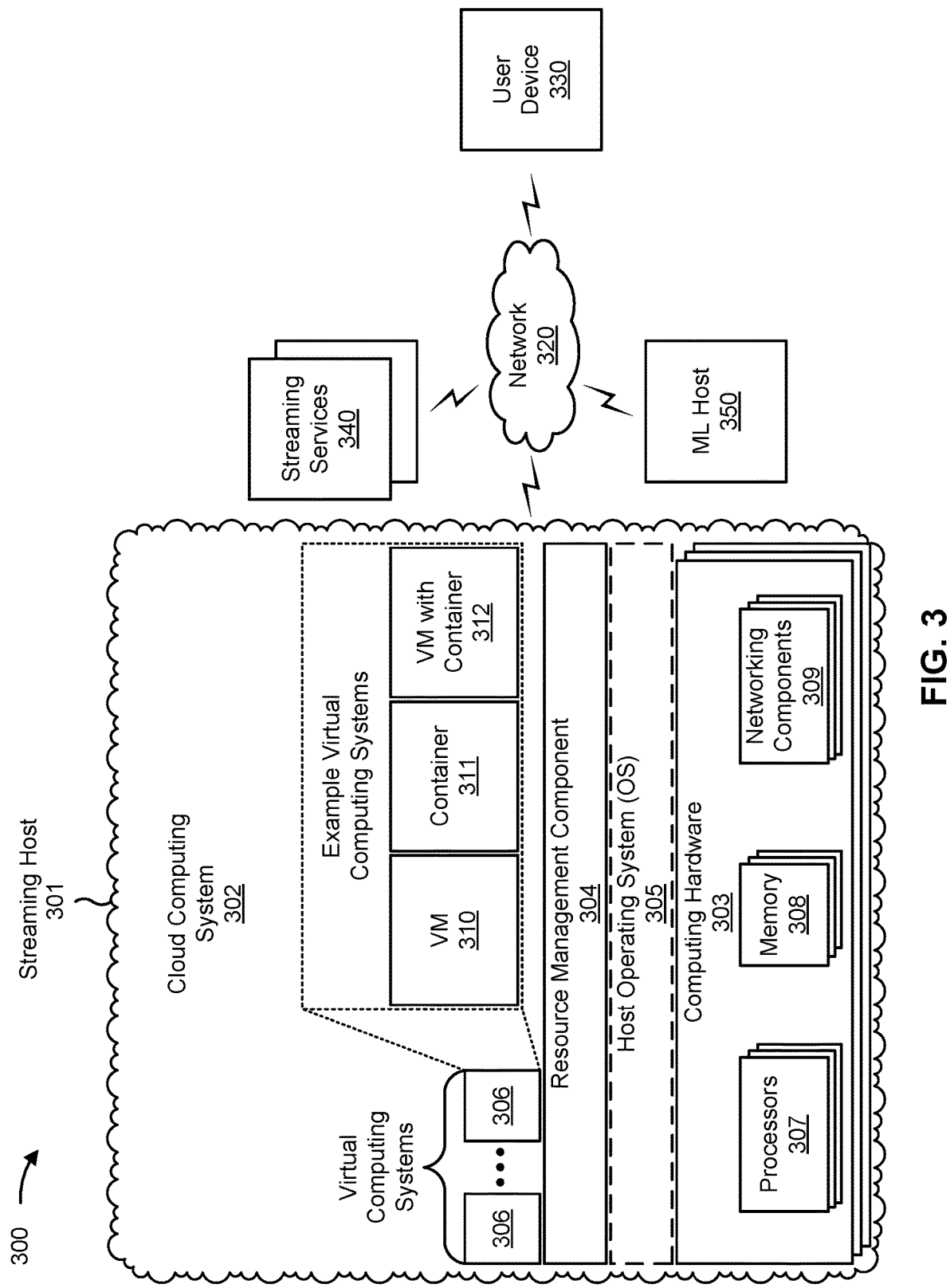
FIG. 3 is a diagram of an example environment in which systems and/or methods described herein may be implemented, in accordance with some embodiments of the present disclosure.

FIG. 3 is a diagram of an example environment 300 in which systems and/or methods described herein may be implemented. As shown in FIG. 3, environment 300 may include a streaming host 301, which may include one or more elements of and/or may execute within a cloud computing system 302. The cloud computing system 302 may include one or more elements 303-312, as described in more detail below. As further shown in FIG. 3, environment 300 may include a network 320, a user device 330, a set of streaming services 340, and/or an ML host 350. Devices and/or elements of environment 300 may interconnect via wired connections and/or wireless connections.

The cloud computing system 302 may include computing hardware 303, a resource management component 304, a host operating system (OS) 305, and/or one or more virtual computing systems 306. The cloud computing system 302 may execute on, for example, an Amazon Web Services platform, a Microsoft Azure platform, or a Snowflake platform. The resource management component 304 may perform virtualization (e.g., abstraction) of computing hardware 303 to create the one or more virtual computing systems 306. Using virtualization, the resource management component 304 enables a single computing device (e.g., a computer or a server) to operate like multiple computing devices, such as by creating multiple isolated virtual computing systems 306 from computing hardware 303 of the single computing device. In this way, computing hardware 303 can operate more efficiently, with lower power consumption, higher reliability, higher availability, higher utilization, greater flexibility, and lower cost than using separate computing devices.

The computing hardware 303 may include hardware and corresponding resources from one or more computing devices. For example, computing hardware 303 may include hardware from a single computing device (e.g., a single server) or from multiple computing devices (e.g., multiple servers), such as multiple computing devices in one or more data centers. As shown, computing hardware 303 may include one or more processors 307, one or more memories 308, and/or one or more networking components 309. Examples of a processor, a memory, and a networking component (e.g., a communication component) are described elsewhere herein.

The resource management component 304 may include a virtualization application (e.g., executing on hardware, such as computing hardware 303) capable of virtualizing computing hardware 303 to start, stop, and/or manage one or more virtual computing systems 306. For example, the resource management component 304 may include a hypervisor (e.g., a bare-metal or Type 1 hypervisor, a hosted or Type 2 hypervisor, or another type of hypervisor) or a virtual machine monitor, such as when the virtual computing systems 306 are virtual machines 310. Additionally, or alternatively, the resource management component 304 may include a container manager, such as when the virtual computing systems 306 are containers 311. In some implementations, the resource management component 304 executes within and/or in coordination with a host operating system 305.

A virtual computing system 306 may include a virtual environment that enables cloud-based execution of operations and/or processes described herein using computing hardware 303. As shown, a virtual computing system 306 may include a virtual machine 310, a container 311, or a hybrid environment 312 that includes a virtual machine and a container, among other examples. A virtual computing system 306 may execute one or more applications using a file system that includes binary files, software libraries, and/or other resources required to execute applications on a guest operating system (e.g., within the virtual computing system 306) or the host operating system 305.

Although the streaming host 301 may include one or more elements 303-312 of the cloud computing system 302, may execute within the cloud computing system 302, and/or may be hosted within the cloud computing system 302, in some implementations, the streaming host 301 may not be cloud-based (e.g., may be implemented outside of a cloud computing system) or may be partially cloud-based. For example, the streaming host 301 may include one or more devices that are not part of the cloud computing system 302, such as device 400 of FIG. 4, which may include a standalone server or another type of computing device. The streaming host 301 may perform one or more operations and/or processes described in more detail elsewhere herein.

The network 320 may include one or more wired and/or wireless networks. For example, the network 320 may include a cellular network, a public land mobile network (PLMN), a local area network (LAN), a wide area network (WAN), a private network, the Internet, and/or a combination of these or other types of networks. The network 320 enables communication among the devices of the environment 300.

The user device 330 may include one or more devices capable of receiving, generating, storing, processing, and/or providing information associated with multimedia content, as described elsewhere herein. The user device 330 may include a communication device and/or a computing device. For example, the user device 330 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device. The user device 330 may communicate with one or more other devices of environment 300, as described elsewhere herein.

The set of streaming services 340 may include one or more devices capable of receiving, generating, storing, processing, and/or providing information associated with multimedia content, as described elsewhere herein. The set of streaming services 340 may include a set of communication devices and/or computing devices. For example, the set of streaming services 340 may include a set of databases, servers, database servers, application servers, client servers, web servers, host servers, proxy servers, virtual servers (e.g., executing on computing hardware), servers in a cloud computing system, devices that include computing hardware used in a cloud computing environment, and/or similar types of devices. The set of streaming services 340 may communicate with one or more other devices of environment 300, as described elsewhere herein.

The ML host 350 may include one or more devices capable of receiving, generating, storing, processing, and/or providing information associated with machine learning models, as described elsewhere herein. The ML host 350 may include a communication device and/or a computing device. For example, the ML host 350 may include a server, a database server, an application server, a client server, a web server, a host server, a proxy server, a virtual server (e.g., executing on computing hardware), a server in a cloud computing system, a device that includes computing hardware used in a cloud computing environment, or a similar type of device. The ML host 350 may communicate with one or more other devices of environment 300, as described elsewhere herein.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of the environment 300 may perform one or more functions described as being performed by another set of devices of the environment 300.

Figure 4:
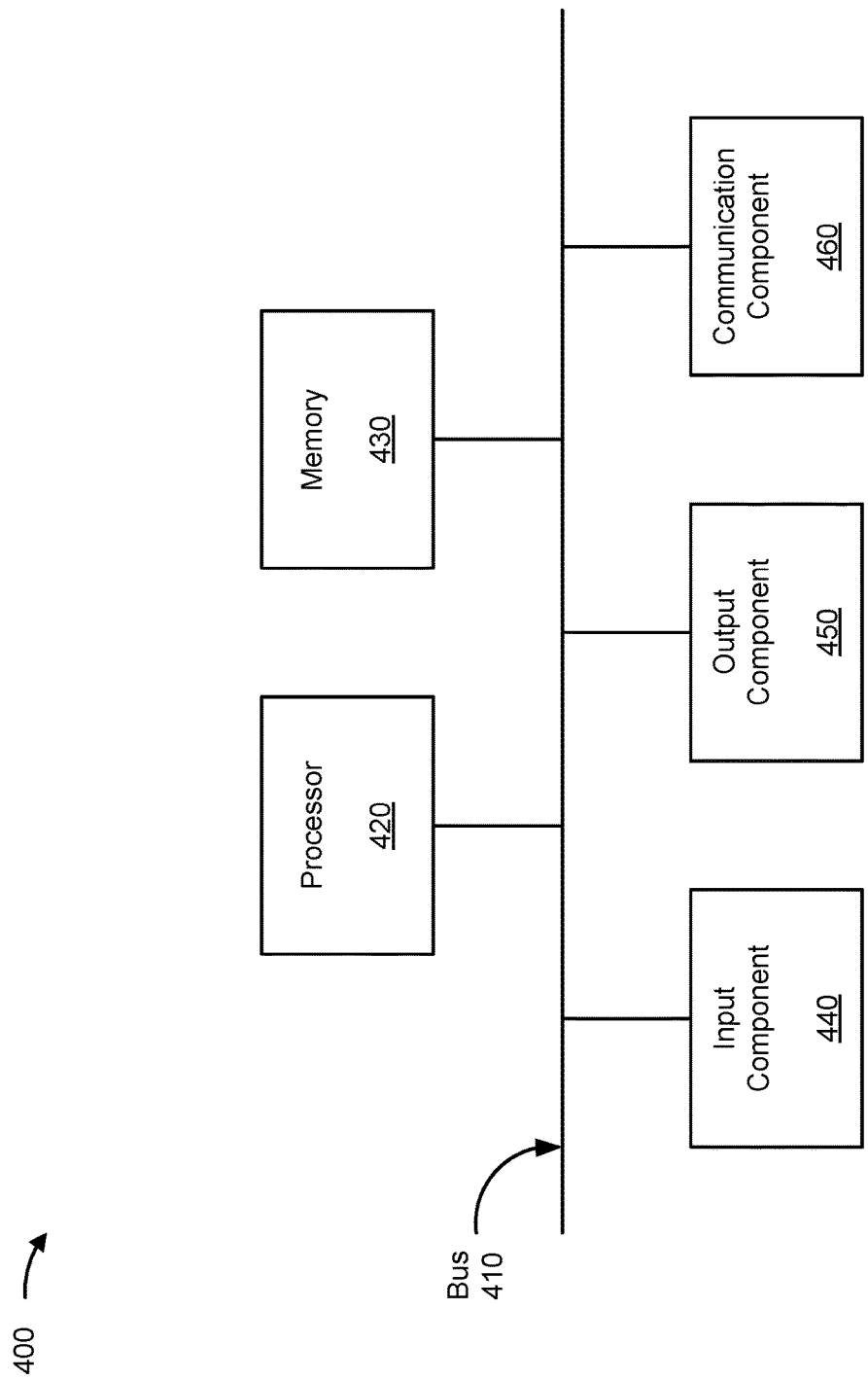
FIG. 4 is a diagram of example components of one or more devices of FIG. 3, in accordance with some embodiments of the present disclosure.

FIG. 4 is a diagram of example components of a device 400 associated with unified multimedia streaming. The device 400 may correspond to a user device 330, a streaming service 340, and/or an ML host 350. In some implementations, a user device 330, a streaming service 340, and/or an ML host 350 may include one or more devices 400 and/or one or more components of the device 400. As shown in FIG. 4, the device 400 may include a bus 410, a processor 420, a memory 430, an input component 440, an output component 450, and/or a communication component 460.

The bus 410 may include one or more components that enable wired and/or wireless communication among the components of the device 400. The bus 410 may couple together two or more components of FIG. 4, such as via operative coupling, communicative coupling, electronic coupling, and/or electric coupling. For example, the bus 410 may include an electrical connection (e.g., a wire, a trace, and/or a lead) and/or a wireless bus. The processor 420 may include a central processing unit, a graphics processing unit, a microprocessor, a controller, a microcontroller, a digital signal processor, a field-programmable gate array, an application-specific integrated circuit, and/or another type of processing component. The processor 420 may be implemented in hardware, firmware, or a combination of hardware and software. In some implementations, the processor 420 may include one or more processors capable of being programmed to perform one or more operations or processes described elsewhere herein.

The memory 430 may include volatile and/or nonvolatile memory. For example, the memory 430 may include random access memory (RAM), read only memory (ROM), a hard disk drive, and/or another type of memory (e.g., a flash memory, a magnetic memory, and/or an optical memory). The memory 430 may include internal memory (e.g., RAM, ROM, or a hard disk drive) and/or removable memory (e.g., removable via a universal serial bus connection). The memory 430 may be a non-transitory computer-readable medium. The memory 430 may store information, one or more instructions, and/or software (e.g., one or more software applications) related to the operation of the device 400. In some implementations, the memory 430 may include one or more memories that are coupled (e.g., communicatively coupled) to one or more processors (e.g., processor 420), such as via the bus 410. Communicative coupling between a processor 420 and a memory 430 may enable the processor 420 to read and/or process information stored in the memory 430 and/or to store information in the memory 430.

The input component 440 may enable the device 400 to receive input, such as user input and/or sensed input. For example, the input component 440 may include a touch screen, a keyboard, a keypad, a mouse, a button, a microphone, a switch, a sensor, a global positioning system sensor, a global navigation satellite system sensor, an accelerometer, a gyroscope, and/or an actuator. The output component 450 may enable the device 400 to provide output, such as via a display, a speaker, and/or a light-emitting diode. The communication component 460 may enable the device 400 to communicate with other devices via a wired connection and/or a wireless connection. For example, the communication component 460 may include a receiver, a transmitter, a transceiver, a modem, a network interface card, and/or an antenna.

The device 400 may perform one or more operations or processes described herein. For example, a non-transitory computer-readable medium (e.g., memory 430) may store a set of instructions (e.g., one or more instructions or code) for execution by the processor 420. The processor 420 may execute the set of instructions to perform one or more operations or processes described herein. In some implementations, execution of the set of instructions, by one or more processors 420, causes the one or more processors 420 and/or the device 400 to perform one or more operations or processes described herein. In some implementations, hardwired circuitry may be used instead of or in combination with the instructions to perform one or more operations or processes described herein. Additionally, or alternatively, the processor 420 may be configured to perform one or more operations or processes described herein. Thus, implementations described herein are not limited to any specific combination of hardware circuitry and software.

The number and arrangement of components shown in FIG. 4 are provided as an example. The device 400 may include additional components, fewer components, different components, or differently arranged components than those shown in FIG. 4. Additionally, or alternatively, a set of components (e.g., one or more components) of the device 400 may perform one or more functions described as being performed by another set of components of the device 400.

Figure 5:
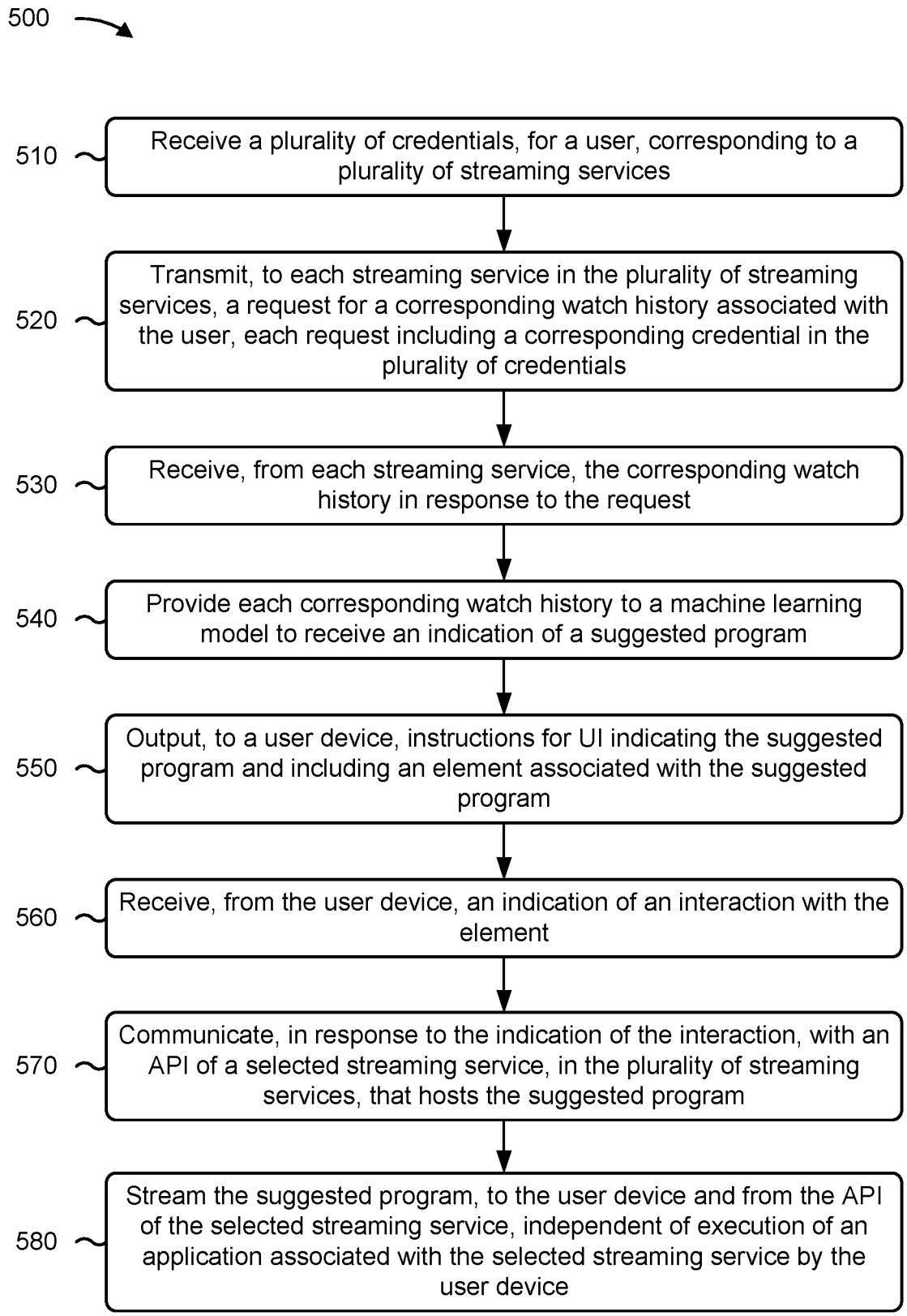
FIG. 5 is a flowchart of an example process relating to unified multimedia streaming, in accordance with some embodiments of the present disclosure.

FIG. 5 is a flowchart of an example process 500 associated with unified multimedia streaming. In some implementations, one or more process blocks of FIG. 5 may be performed by a streaming host 301. In some implementations, one or more process blocks of FIG. 5 may be performed by another device or a group of devices separate from or including the streaming host 301, such as a user device 330, a streaming service 340, and/or an ML host 350. Additionally, or alternatively, one or more process blocks of FIG. 5 may be performed by one or more components of the device 400, such as processor 420, memory 430, input component 440, output component 450, and/or communication component 460.

As shown in FIG. 5, process 500 may include receiving a plurality of credentials, for a user, corresponding to a plurality of streaming services (block 510). For example, the streaming host 301 (e.g., using processor 420, memory 430, input component 440, and/or communication component 460) may receive a plurality of credentials, for a user, corresponding to a plurality of streaming services, as described above in connection with reference number 105 of FIG. 1A. As an example, the streaming host 301 may transmit a request, and a user device may transmit the plurality of credentials in response to the request. For example, the request may include an HTTP request, and the plurality of credentials may be transmitted in an HTTP response (e.g., encrypted using TLS or SSL, consistent with HTTPS).

As further shown in FIG. 5, process 500 may include transmitting, to each streaming service in the plurality of streaming services, a request for a corresponding watch history associated with the user, each request including a corresponding credential in the plurality of credentials (block 520). For example, the streaming host 301 (e.g., using processor 420, memory 430, and/or communication component 460) may transmit, to each streaming service in the plurality of streaming services, a request for a corresponding watch history associated with the user, each request including a corresponding credential in the plurality of credentials, as described above in connection with reference numbers 115-1 through 115-n of FIG. 1A. As an example, each request may include an HTTP request, an FTP request, and/or an API call.

As further shown in FIG. 5, process 500 may include receiving, from each streaming service, the corresponding watch history in response to the request (block 530). For example, the streaming host 301 (e.g., using processor 420, memory 430, input component 440, and/or communication component 460) may receive, from each streaming service, the corresponding watch history in response to the request, as described above in connection with reference numbers 120-1 through 120-n of FIG. 1B. As an example, each streaming service may transmit the corresponding watch history in response to the request from the streaming host 301. The corresponding watch history may be encoded in a single file or in multiple files and may be included in an HTTP response, an FTP response, and/or a return from an API function.

As further shown in FIG. 5, process 500 may include providing each corresponding watch history to a machine learning model to receive an indication of a suggested program (block 540). For example, the streaming host 301 (e.g., using processor 420 and/or memory 430) may provide each corresponding watch history to a machine learning model to receive an indication of a suggested program, as described above in connection with reference number 125 of FIG. 1B. As an example, the streaming host 301 may transmit, and an ML host may receive, a request including each corresponding watch history. Accordingly, the ML host may transmit, and the streaming host 301 may receive, the indication of the suggested program in response to the request.

As further shown in FIG. 5, process 500 may include outputting, to a user device, instructions for a UI indicating the suggested program and including an element associated with the suggested program (block 550). For example, the streaming host 301 (e.g., using processor 420, memory 430, and/or output component 450) may output, to a user device, instructions for a UI indicating the suggested program and including an element associated with the suggested program, as described above in connection with reference number 135 of FIG. 1C. As an example, the streaming host 301 may provide a unified API to the user device, and the streaming host 301 may output the instructions for the UI using the unified API.

As further shown in FIG. 5, process 500 may include receiving, from the user device, an indication of an interaction with the element (block 560). For example, the streaming host 301 (e.g., using processor 420, memory 430, input component 440, and/or communication component 460) may receive, from the user device, an indication of an interaction with the element, as described above in connection with reference number 140 of FIG. 1C. As an example, the indication of the interaction may include a request for the suggested program and may include an HTTP request and/or an API call, among other examples. The request may include (e.g., in a header and/or as an argument) an indication of the suggested program (e.g., a name of the suggested program and/or an alphanumeric identifier associated with the suggested program, among other examples).

As further shown in FIG. 5, process 500 may include communicating, in response to the indication of the interaction, with an API of a selected streaming service, in the plurality of streaming services, that hosts the suggested program (block 570). For example, the streaming host 301 (e.g., using processor 420 and/or memory 430) may communicate, in response to the indication of the interaction, with an API of a selected streaming service, in the plurality of streaming services, that hosts the suggested program, as described above in connection with FIG. 1C. As an example, the streaming host 301 may communicate with the selected streaming service in response to the indication of the interaction and in order to stream the suggested program.

As further shown in FIG. 5, process 500 may include streaming the suggested program, to the user device and from the API of the selected streaming service, independently of execution of an application associated with the selected streaming service by the user device (block 580). For example, the streaming host 301 (e.g., using processor 420 and/or memory 430) may stream the suggested program, to the user device and from the API of the selected streaming service, independently of execution of an application associated with the selected streaming service by the user device, as described above in connection with reference number 150 of FIG. 1C. As an example, the streaming host 301 may forward packets, received from the selected streaming service, to the user device.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel. The process 500 is an example of one process that may be performed by one or more devices described herein. These one or more devices may perform one or more other processes based on operations described herein, such as the operations described in connection with FIGS. 1A-1E and/or FIG. 2. Moreover, while the process 500 has been described in relation to the devices and components of the preceding figures, the process 500 can be performed using alternative, additional, or fewer devices and/or components. Thus, the process 500 is not limited to being performed with the example devices, components, hardware, and software explicitly enumerated in the preceding figures.

Figure 6:
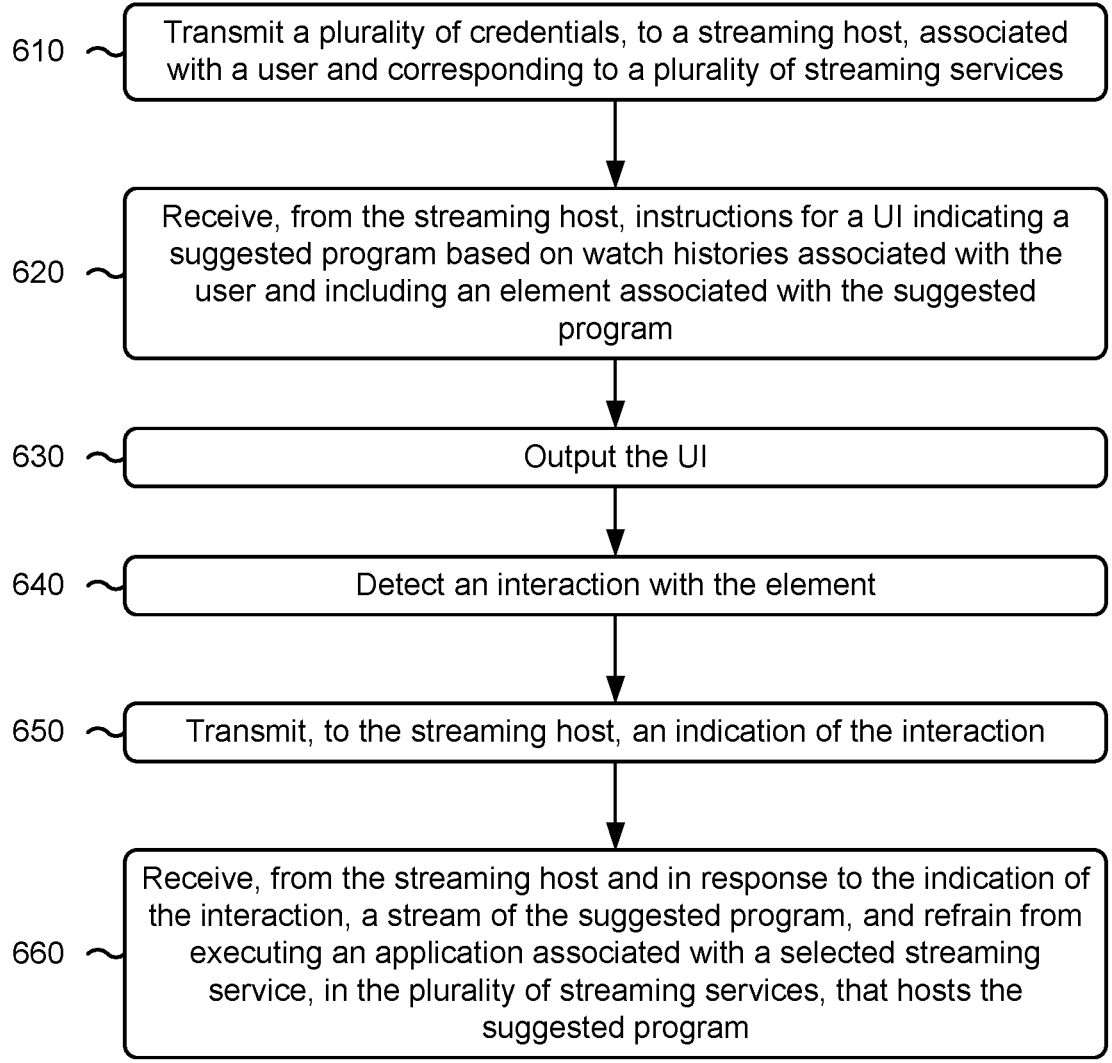
FIG. 6 is a flowchart of an example process relating to unified multimedia streaming, in accordance with some embodiments of the present disclosure.

FIG. 6 is a flowchart of an example process 600 associated with unified multimedia streaming. In some implementations, one or more process blocks of FIG. 6 may be performed by a user device 330. In some implementations, one or more process blocks of FIG. 6 may be performed by another device or a group of devices separate from or including the user device 330, such as a user device 330, a streaming service 340, and/or an ML host 350. Additionally, or alternatively, one or more process blocks of FIG. 6 may be performed by one or more components of the device 400, such as processor 420, memory 430, input component 440, output component 450, and/or communication component 460.

As shown in FIG. 6, process 600 may include transmitting a plurality of credentials, to a streaming host, associated with a user and corresponding to a plurality of streaming services (block 610). For example, the user device 330 (e.g., using processor 420, memory 430, and/or communication component 460) may transmit a plurality of credentials, to a streaming host, associated with a user and corresponding to a plurality of streaming services, as described above in connection with reference number 105 of FIG. 1A. As an example, a user of the user device 330 may provide input (e.g., via an input component of the user device 330) that triggers the user device 330 to transmit the plurality of credentials. For example, a request from the streaming host may result in a UI (e.g., output via an output component of the user device 330), and the user may interact with the UI to trigger the user device 330 to transmit the plurality of credentials.

As further shown in FIG. 6, process 600 may include receiving, from the streaming host, instructions for a UI indicating a suggested program based on watch histories associated with the user and including an element associated with the suggested program (block 620). For example, the user device 330 (e.g., using processor 420, memory 430, input component 440, and/or communication component 460) may receive, from the streaming host, instructions for a UI indicating a suggested program based on watch histories associated with the user and including an element associated with the suggested program, as described above in connection with reference number 135 of FIG. 1C. As an example, the streaming host may provide a unified API to the user device 330, and the user device 330 may receive the instructions for the UI using the unified API.

As further shown in FIG. 6, process 600 may include outputting the UI (block 630). For example, the user device 330 (e.g., using processor 420, memory 430, and/or output component 450) may output the UI, as described above in connection with FIG. 1C. As an example, the user device 330 may output the UI to a display of the user device 330 and/or a speaker of the user device 330, among other examples.

As further shown in FIG. 6, process 600 may include detecting an interaction with the element (block 640). For example, the user device 330 (e.g., using processor 420, memory 430, and/or input component 440) may detect an interaction with the element, as described above in connection with FIG. 1C. As an example, the user device 330 may receive a signal from an input component of the user device 330 and may determine that the signal is associated with the element.

As further shown in FIG. 6, process 600 may include transmitting, to the streaming host, an indication of the interaction (block 650). For example, the user device 330 (e.g., using processor 420, memory 430, and/or communication component 460) may transmit, to the streaming host, an indication of the interaction, as described above in connection with reference number 140 of FIG. 1C. As an example, the indication of the interaction may include a request for the suggested program and may include an HTTP request and/or an API call, among other examples. The request may include (e.g., in a header and/or as an argument) an indication of the suggested program (e.g., a name of the suggested program and/or an alphanumeric identifier associated with the suggested program, among other examples).

As further shown in FIG. 6, process 600 may include receiving, from the streaming host and in response to the indication of the interaction, a stream of the suggested program, and refraining from executing an application associated with a selected streaming service, in the plurality of streaming services, that hosts the suggested program (block 660). For example, the user device 330 (e.g., using processor 420, memory 430, input component 440, and/or communication component 460) may receive, from the streaming host and in response to the indication of the interaction, a stream of the suggested program, and refrain from executing an application associated with a selected streaming service, in the plurality of streaming services, that hosts the suggested program, as described above in connection with reference number 150 of FIG. 1C. As an example, the user device 330 may execute an application associated with the streaming host in order to receive a stream of the suggested program and may therefore access the suggested program without executing the application associated with the selected streaming service.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel. The process 600 is an example of one process that may be performed by one or more devices described herein. These one or more devices may perform one or more other processes based on operations described herein, such as the operations described in connection with FIGS. 1A-1E and/or FIG. 2. Moreover, while the process 600 has been described in relation to the devices and components of the preceding figures, the process 600 can be performed using alternative, additional, or fewer devices and/or components. Thus, the process 600 is not limited to being performed with the example devices, components, hardware, and software explicitly enumerated in the preceding figures.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The hardware and/or software code described herein for implementing aspects of the disclosure should not be construed as limiting the scope of the disclosure. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination and permutation of those items, including single members. As an example, "at least one of: a, b, or c" is intended to cover a, b, c, a-b, a-c, b-c, and a-b-c, as well as any combination with multiple of the same item. As used herein, the term "and/or" used to connect items in a list refers to any combination and any permutation of those items, including single members (e.g., an individual item in the list). As an example, "a, b, and/or c" is intended to cover a, b, c, a-b, a-c, b-c, and a-b-c.

When "a processor" or "one or more processors" (or another device or component, such as "a controller" or "one or more controllers") is described or claimed (within a single claim or across multiple claims) as performing multiple operations or being configured to perform multiple operations, this language is intended to broadly cover a variety of processor architectures and environments. For example, unless explicitly claimed otherwise (e.g., via the use of "first processor" and "second processor" or other language that differentiates processors in the claims), this language is intended to cover a single processor performing or being configured to perform all of the operations, a group of processors collectively performing or being configured to perform all of the operations, a first processor performing or being configured to perform a first operation and a second processor performing or being configured to perform a second operation, or any combination of processors performing or being configured to perform the operations. For example, when a claim has the form "one or more processors configured to: perform X; perform Y; and perform Z," that claim should be interpreted to mean "one or more processors configured to perform X; one or more (possibly different) processors configured to perform Y; and one or more (also possibly different) processors configured to perform Z."

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system for unifying multimedia streaming services, the system comprising:
   one or more memories; and
   one or more processors, communicatively coupled to the one or more memories, configured to:
   receive, by a host device, a plurality of credentials from a user device, for a user, corresponding to a plurality of streaming services;
   transmit, by the host device and to each streaming service in the plurality of streaming services, a request for a corresponding watch history associated with the user, wherein each request includes a corresponding credential in the plurality of credentials;
   receive, by the host device and from each streaming service, the corresponding watch history in response to the request;
   provide, by the host device, each corresponding watch history to a machine learning model to receive an indication of a suggested program;
   output, by the host device and to the user device, instructions for a user interface indicating the suggested program and including an element associated with the suggested program;
   receive, by the host device and from the user device, an indication of an interaction with the element;
   communicate, by the host device and in response to the indication of the interaction, with an application programming interface (API) of a selected streaming service, in the plurality of streaming services, that hosts the suggested program;
   receive, by the host device and via the API of the selected streaming service, the suggested program;
   stream the suggested program, by the host device to the user device and from the API of the selected streaming service, independently of execution of an application associated with the selected streaming service by the user device;
   establish a connection between the user device and a digital rights management (DRM) layer of the selected streaming service; and
   transmit, by the host device and to the user device, a file encoding a single invoice for the plurality of streaming services.

2. The system of claim 1, wherein the plurality of credentials include at least one username-password pair.

3. The system of claim 1, wherein the plurality of credentials include at least one token.

4. The system of claim 1, wherein the one or more processors are configured to:
   receive, from the user device, feedback associated with the suggested program; and
   update the machine learning model using the feedback.

5. The system of claim 1, wherein the one or more processors are configured to:
   receive, from the user device, a selection of a profile associated with the user, wherein the machine learning model is further provided an indication of the profile.

6. The system of claim 1, wherein the one or more processors are further configured to:
   receive, from the user device, a selection of a profile associated with the user,
      wherein each request includes an indication of the profile.

7. The system of claim 1, wherein the suggested program is streamed in an encrypted format that is decrypted based on information received via the DRM layer.

8. A method of unifying multimedia streaming services, comprising:
   transmitting a plurality of credentials, from a user device and to a streaming host, associated with a user and corresponding to a plurality of streaming services;
   receiving, at the user device and from the streaming host, instructions for a user interface (UI) indicating a suggested program based on watch histories associated with the user and including an element associated with the suggested program;
   outputting the UI;
   detecting an interaction with the element;
   transmitting, from the user device and to the streaming host, an indication of the interaction;
   receiving, from the streaming host, in response to the indication of the interaction, and via an application programming interface (API) of a selected streaming service, of the plurality of streaming services, that hosts the suggested program, a stream of the suggested program,
      wherein the user device refrains from executing an application associated with the selected streaming service;
   establishing a connection between the user device and a digital rights management (DRM) layer of the selected streaming service; and
   receiving a file encoding a single invoice for the plurality of streaming services.

9. The method of claim 8, wherein the plurality of credentials are included in a plurality of messages, and each message further includes an authorization to access the watch histories.

10. The method of claim 8, wherein detecting the interaction with the element comprises:
   receiving a signal from an input component of the user device; and
   determining that the signal is associated with the element.

11. The method of claim 8, wherein the indication of the interaction includes a request for the suggested program.

12. The method of claim 8, wherein the streaming host is associated with an endpoint that is different from a plurality of endpoints corresponding to the plurality of streaming services.

13. The method of claim 8, further comprising:
   transmitting a single transaction authorization, from the user device and to the streaming host, for the plurality of streaming services.

14. The method of claim 8, wherein the suggested program is streamed in an encrypted format that is decrypted based on information received via the DRM layer.

15. A non-transitory computer-readable medium storing a set of instructions for unifying multimedia streaming services, the set of instructions comprising:
   one or more instructions that, when executed by one or more processors of a device, cause the device to:
      receive a plurality of credentials, for a user, corresponding to a plurality of streaming services;
      transmit, to an application programming interface (API) for each streaming service in the plurality of streaming services, a request for a corresponding streaming history associated with the user, wherein each request includes a corresponding credential in the plurality of credentials;
      receive, from each API, the corresponding streaming history in response to the request;
      provide each corresponding streaming history to a machine learning model to receive an indication of a suggested program;
      output, to a user device, instructions for a user interface (UI) indicating the suggested program and including an element associated with the suggested program;
      receive, via an API of a selected streaming service, of the plurality of streaming services, that hosts the suggested program, a stream of the suggested program;
      refrain from executing an application associated with the selected streaming service;
      establish a connection between the user device and a digital rights management (DRM) layer of the selected streaming service; and
      transmit a file encoding a single invoice for the plurality of streaming services.

16. The non-transitory computer-readable medium of claim 15, wherein the one or more instructions, when executed by the one or more processors, cause the device to:
   transmit, to each streaming service, an additional request for a corresponding updated streaming history associated with the user, wherein each additional request is transmitted according to a schedule.

17. The non-transitory computer-readable medium of claim 16, wherein the one or more instructions, when executed by the one or more processors, cause the device to:
   provide each corresponding updated streaming history to the machine learning model to receive an indication of an additional suggested program; and
   output, to the user device, instructions to update the UI to indicate the additional suggested program.

18. The non-transitory computer-readable medium of claim 15, wherein the one or more instructions, when executed by the one or more processors, cause the device to:
   provide a unified API to the user device,
      wherein the instructions for the UI are outputted using the unified API.

19. The non-transitory computer-readable medium of claim 15, wherein the one or more instructions, that cause the device to provide each corresponding streaming history to the machine learning model, cause the device to:
   transmit each corresponding streaming history to a machine learning host associated with the machine learning model; and
   receive the indication of the suggested program from the machine learning host.

20. The non-transitory computer-readable medium of claim 15, wherein the suggested program is streamed in an encrypted format that is decrypted based on information received via the DRM layer.

* * * * *